(12) United States Patent
Malstron et al.

(10) Patent No.: US 8,152,560 B2
(45) Date of Patent: Apr. 10, 2012

(54) CONNECTIVITY SENSING ASSEMBLY

(75) Inventors: Charles Randall Malstron, Lebanon, PA (US); Charles David Fry, New Bloomfield, PA (US); Keith James McKechnie, Holly Springs, NC (US); Terry Patrick Bowen, Dillsburg, PA (US); Henry Otto Herrmann, Jr., Elizabethtown, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/762,813

(22) Filed: Apr. 19, 2010

(65) Prior Publication Data

US 2011/0256767 A1    Oct. 20, 2011

(51) Int. Cl.
*H01R 13/641* (2006.01)

(52) U.S. Cl. ............... 439/488; 439/188; 439/620.01; 439/913

(58) Field of Classification Search ............ 439/188, 439/488, 489, 620.01, 913
See application file for complete search history.

(56) References Cited

U.S. PATENT DOCUMENTS

| | | | |
|---|---|---|---|
| 4,968,929 A | 11/1990 | Hauck et al. | |
| 5,107,532 A | 4/1992 | Hansen et al. | |
| 5,166,970 A | 11/1992 | Ward | |
| 5,394,503 A * | 2/1995 | Dietz et al. | 385/135 |
| 5,483,467 A | 1/1996 | Krupka et al. | |
| 5,509,817 A * | 4/1996 | Tsuji | 439/188 |
| 5,726,912 A | 3/1998 | Krall, Jr. et al. | |
| 5,835,006 A | 11/1998 | Michalak et al. | |
| 5,854,824 A | 12/1998 | Bengal et al. | |
| 6,222,908 B1 | 4/2001 | Bartolutti et al. | |
| 6,234,830 B1 | 5/2001 | Ensz et al. | |
| 6,285,293 B1 | 9/2001 | German et al. | |
| 6,330,307 B1 | 12/2001 | Bloch et al. | |
| 6,350,148 B1 | 2/2002 | Bartolutti et al. | |
| 6,453,014 B1 | 9/2002 | Jacobson et al. | |
| 6,493,319 B1 | 12/2002 | Kramarczyk et al. | |
| 6,522,737 B1 | 2/2003 | Bartolutti et al. | |
| 6,574,586 B1 | 6/2003 | David et al. | |
| 6,626,697 B1 | 9/2003 | Martin et al. | |
| 6,684,179 B1 | 1/2004 | David | |
| 6,725,177 B2 | 4/2004 | David et al. | |
| 6,784,802 B1 | 8/2004 | Stanescu | |
| 6,837,755 B1 | 1/2005 | Kitajima et al. | |
| 6,868,265 B2 | 3/2005 | Zodnik | |
| 6,942,498 B2 | 9/2005 | Naa | |
| 6,961,675 B2 | 11/2005 | David | |
| 6,976,867 B2 | 12/2005 | Navarro et al. | |
| 7,153,142 B2 | 12/2006 | Shifris et al. | |
| 7,160,143 B2 | 1/2007 | David et al. | |
| 7,193,422 B2 | 3/2007 | Velleca et al. | |
| 7,207,846 B2 | 4/2007 | Caveney et al. | |

(Continued)

FOREIGN PATENT DOCUMENTS

EP     1 561 122 B1    8/2005

(Continued)

*Primary Examiner* — James Harvey

(57) ABSTRACT

A receptacle assembly includes a housing having a front mating face and receptacles configured to receive plugs therein through the front mating face, where the plugs have connectivity pins attached thereto. The receptacle module includes connectivity sensor areas associated with the receptacles, where each connectivity sensor area is positioned adjacent the corresponding receptacle. Each connectivity sensor area has a first connectivity sensor and a second connectivity sensor that is electrically isolated from the first connectivity sensor when the plug is disconnected from the receptacle. Both the first and second connectivity sensors are configured to be engaged by different connectivity pins of the plug when the plug is received in the corresponding receptacle to form a sense circuit.

20 Claims, 6 Drawing Sheets

U.S. PATENT DOCUMENTS

| | | |
|---|---|---|
| 7,258,493 B2 | 8/2007 | Milette |
| 7,297,018 B2 | 11/2007 | Caveney et al. |
| 7,312,715 B2 | 12/2007 | Shalts et al. |
| 7,315,224 B2 | 1/2008 | Gurovich et al. |
| 7,370,106 B2 | 5/2008 | Caveney |
| 7,376,734 B2 | 5/2008 | Caveney |
| 7,563,102 B2 | 7/2009 | Nordin et al. |
| 2002/0090858 A1 | 7/2002 | Caveney |
| 2006/0148279 A1 | 7/2006 | German et al. |
| 2008/0122579 A1 | 5/2008 | German et al. |
| 2010/0055971 A1* | 3/2010 | Craig et al. .......... 439/488 |

FOREIGN PATENT DOCUMENTS

EP    1 758 028 A1    2/2007

* cited by examiner

900
CONNECTIVITY SENSING ASSEMBLY

CROSS REFERENCE TO RELATED APPLICATIONS

This application relates to U.S. patent application Ser. No. 12/762,885, filed Apr. 19, 2010 and entitled "PLUG ASSEMBLY FOR A CONNECTIVITY MANGEMENT SYSTEM".

BACKGROUND OF THE INVENTION

The subject matter herein relates generally to multi-part connector assemblies, and more particularly, to connectivity sensing assemblies.

Known panels and modules exist having multiple receptacle connectors in a common housing providing a compact arrangement of receptacle connectors and multiple connection ports. Accordingly, such a connector assembly is referred to as a multiple port connector assembly. The receptacle connectors may be in the form of modular jacks that establish mating connections with corresponding modular plugs. The receptacle connectors, that is, modular jacks, each have modular plug receiving cavities.

In order to better operate large electrical networks, connectivity management systems have been developed to monitor connections between components within the network. In some networks, the panels, modules or other network components include a sensor arranged along a mating face of the connector assembly. The sensor may interface with a sensor probe or other device when the plug is mated with the jack. Connectivity data is transmitted through the sensor and the probe or other device to determine which modular plug is connected to which modular jack and/or where each patch cord or cable is routed within the network system.

Known connectivity management systems are not without disadvantages. For instance, the patch cords or cables that are connected to the receptacle connectors have a separate wire that is connected to the cord or cable that extends between the plugs at either end thereof. Such cords are expensive to manufacture. A need remains for a connectivity management system that may be used without cords having extra wires dedicated to connectivity management.

BRIEF DESCRIPTION OF THE INVENTION

In one embodiment, a receptacle assembly is provided that includes a housing having a front mating face and receptacles configured to receive plugs therein through the front mating face, where the plugs have connectivity pins attached thereto. The receptacle module includes connectivity sensor areas associated with the receptacles, where each connectivity sensor area is positioned adjacent the corresponding receptacle. Each connectivity sensor area has a first connectivity sensor and a second connectivity sensor that is electrically isolated from the first connectivity sensor when the plug is disconnected from the receptacle. Both the first and second connectivity sensors are configured to be engaged by different connectivity pins of the plug when the plug is received in the corresponding receptacle to form a sense circuit.

In another embodiment, a receptacle assembly is provided including a housing having a front mating face and receptacles configured to receive plugs therein through the front mating face. The receptacle module also includes ground contacts being electrically grounded that are positioned adjacent corresponding ones of the receptacles. The receptacle module also includes sense contacts forming part of a connectivity management system. The sense contacts are positioned adjacent corresponding ones of the receptacles. The ground contacts and the sense contacts are arranged in pairs as part of a sense circuit, where the ground contact and the sense contact of a particular sense circuit are configured to be engaged by different connectivity pins of one of the plugs when the particular plug is loaded into the corresponding receptacle so that upon mating of the plug and receptacle the sense circuit is created to transfer connectivity information through the connectivity management system.

In a further embodiment, a receptacle assembly is provided including a housing having a front mating face and receptacles configured to receive plugs therein through the front mating face. A ground contact strip is electrically grounded and extends across the front mating face adjacent the receptacles. Sense contacts are positioned adjacent corresponding ones of the receptacles. The sense contacts have sense pads that extend over the ground contact strip such that the ground contact strip is positioned between the front mating face of the housing and the sense pads. An insulator is positioned between each of the sense contacts and the ground contact strip that insulates the sense contacts from direct contact with the ground contact strip.

DETAILED DESCRIPTION OF THE INVENTION

Figure 1:
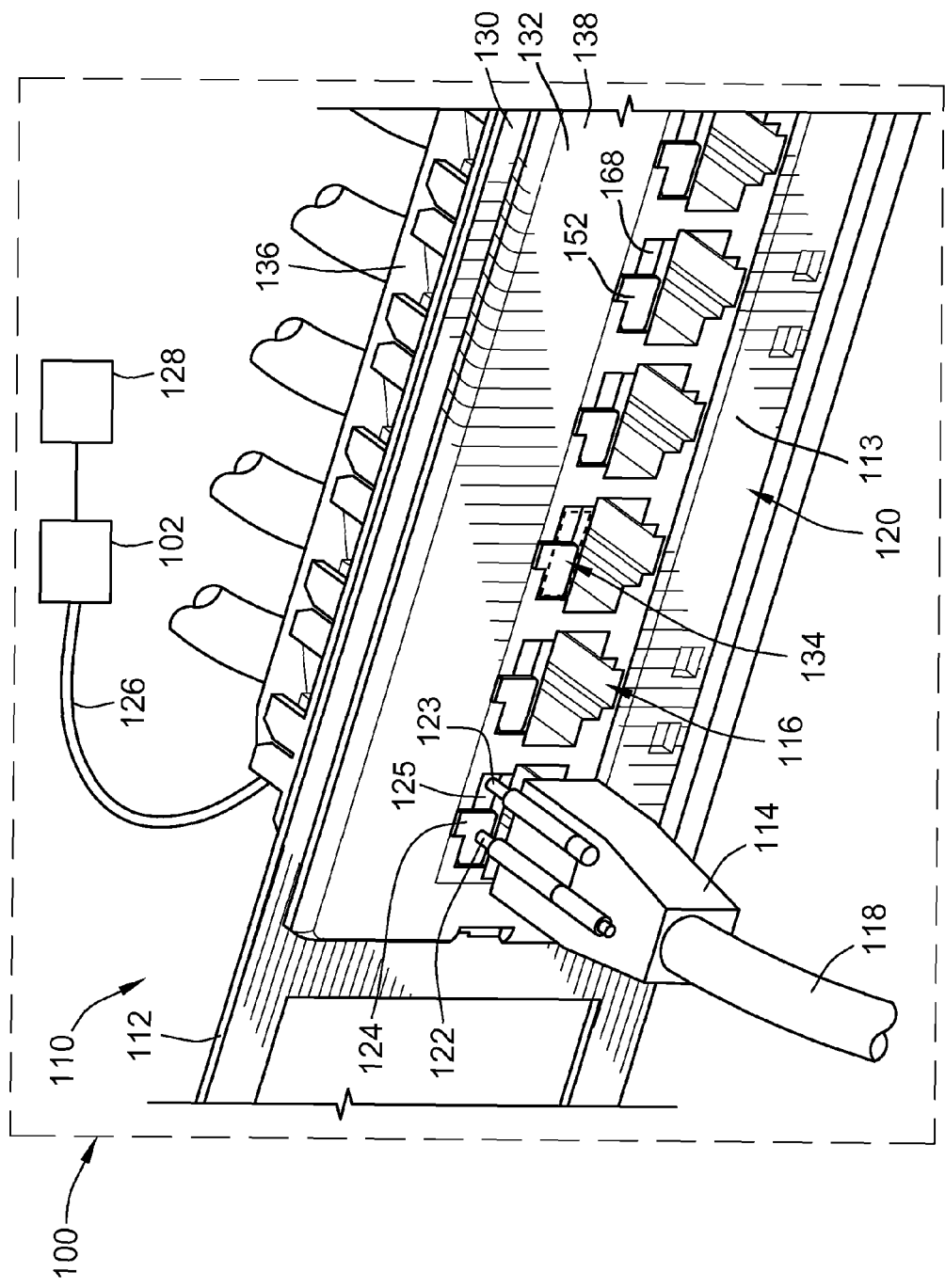
FIG. 1 is a schematic illustration of a connectivity management system showing a receptacle assembly formed in accordance with an exemplary embodiment.

FIG. 1 is a schematic illustration of a connectivity management system 100 showing a receptacle assembly 120 formed in accordance with an exemplary embodiment. The connectivity management system 100 includes an analyzer 102 for analyzing the connectivity of the various network components of a cable interconnect system 110. The receptacle assembly 120 includes one or more panels 112 and a plurality of receptacle modules 113 mounted to the panels 112. The receptacle assembly 120, including the panels 112 and receptacle modules 113, may define patch panels, switches or other network components. In an alternative embodiment, the receptacle assembly 120 may not include the receptacle module 113, but rather may just include the panel 112, with modular jacks mounted directly thereto.

Plugs 114 may be connected to any of the receptacles 116 of the receptacle assemblies 120. In an exemplary embodiment, the modular plugs 114 represent smart plugs containing data that uniquely identifies the particular plug, wither internally, such as on a circuit board, or via a separate wire that is attached to the plug 114. The plugs 114 are provided at ends of cables 118, such as patch cords. In an exemplary embodiment, each of the plugs 114 include a pair of connectivity pins 122, 123 used to indicate connectivity, as described in further detail below. The cables 118 may be routed between various ones of the receptacle assemblies 120 or other network components.

The receptacle assemblies 120 include first and second connectivity sensors 124, 125 at a front mating face 132 of the module 113 for interfacing with the connectivity pins 122, 123 when the plugs 114 are received in the receptacles 116. The connectivity sensors 124, 125 are used to indicate connectivity, such as by sensing the presence of the connectivity pins 122, 123 and sending signals relating to the presence of the connectivity pins 122, 123 to the analyzer 102, such as via connectivity cables 126 that interconnect the receptacle assemblies 120 and the analyzer 102. In an exemplary embodiment, a pair of connectivity sensors 124, 125 are provided adjacent each receptacle 116, such as above each receptacle 116. The pair of connectivity pins 122, 123 engages the pair of connectivity sensors 124, 125.

The analyzer 102 determines the connectivity of the cables within the cable interconnect system 110 (e.g. which plug 114 is connected to which receptacle 116 and/or where each patch cord or cable 118 is routed within the cable interconnect system 110). Optionally, the analyzer 102 may be mounted to a rack or other support structure of the cable interconnect system 110. Alternatively, the analyzer 102 may be positioned remote from the rack and the network panels 112. Data relating to the connectivity or interconnection of the patch cords or cables 118 is transmitted to the analyzer 102 by the connectivity cables 126.

In an exemplary embodiment, the analyzer 102 is interconnected with a computing device 128 by an Ethernet connection or another connection, such as a direct connection by a cable connector. The connectivity data is gathered by connectivity sensors 124, 125 that sense when the plugs 114 are mated with the receptacles 116. The connectivity data gathered by the analyzer 102 may be transmitted to the computing device 128 and then viewed, stored and/or manipulated by the computing device 128. Alternatively, the analyzer 102 may store and/or manipulate the connectivity data. Optionally, the analyzer 102 and the computing device 128 may be one device. Optionally, multiple analyzers 102 may be connected to the computing device 128.

The receptacle assembly 120 includes a housing 130 having a front mating face 132. The housing 130 includes a plurality of the receptacles 116 that are configured to receive the plugs 114. The housing 130 may form part of the module 113, or may be defined by the panel 112, such as when the modules 113 are not used. The connectivity sensors 124, 125 for each receptacle 116 are arranged in connectivity sensor areas 134, which are the areas that the connectivity pins 122, 123 engage the receptacle assembly 120. Each receptacle 116 has a corresponding connectivity sensor area 134. When the plug 114 is loaded into the receptacle 116, the connectivity pins 122, 123 engage the connectivity sensors 124, 125 and create a sense circuit. The analyzer 102 analyzes the sense circuit to determine the connectivity status. For example, particular information about the plug 114 (e.g. information that uniquely identifies the plug 114, such as by serial number or by another unique identifier) may be conveyed by the connectivity pins 122, 123 to the connectivity sensors 124, 125, and such information may then be conveyed to the analyzer 102. As such, the sense circuit defines a plug connectivity or location identification circuit. The plugs 114 may define smart connectors having embedded circuitry and/or memory containing information that uniquely identifies the plug 114. Such information is capable of being conveyed to the connectivity sensors 124, 125 by the connectivity pins 122, 123. When both plugs 114 at either ends of the cable 118 are identified as belonging to the same patch cord, or otherwise being connected together by the particular cable 118, the analyzer 102 is able to determine which two receptacles 116 are electrically interconnected by the particular cable 118. In the illustrated embodiment, the connectivity sensor areas 134 are positioned vertically above the corresponding receptacle 116, however other locations are possible in alternative embodiments, such as vertically below the receptacle 116.

In an exemplary embodiment, the receptacle assembly 120 includes a plurality of modular jacks 136 that are removably coupled to the housing 130. In an alternative embodiment, rather than having individual modular jacks 136 coupled to the housing 130, the housing may have a plurality of modular jacks integrated therein, such as in a stacked jack configuration. The modular jacks 136 are cable mounted with an individual cable being associated with, and extending from, a corresponding one of the modular jacks 136. The modular jacks 136 and associated receptacles 116 are accessible through a faceplate 138 at the front mating face 132. In an alternative embodiment, the housing 130 may be provided without a faceplate 138, but rather may be coupled to the rear of the panel 112 or may not include a separate faceplate component. The connectivity sensors 124, 125 may be provided on or accessible through the faceplate 138 or another portion of the housing 130 or panel 112. As such, when the plugs 114 are loaded into the receptacles 116, the connectivity pins 122, 123 engage the connectivity sensors 124, 125. The connectivity pins 122, 123 are mounted adjacent to the mating face of the plug 114 such that when the mating face of the plug is received in the opening of the receptacle 116, the connectivity pins 122, 123 contact the connectivity sensors 124, 125.

In an alternative embodiment, rather than individual modular jacks, the receptacles 116 may be electrically connected to internal electrical components, such as a circuit board and one or more rear electrical connectors coupled to the circuit board. A cable connector may then be mated with the one or more electrical connectors. As such, one or more of the receptacles 116 may be electrically connected to a corresponding cable connector at the rear of the housing 130.

Figure 2:
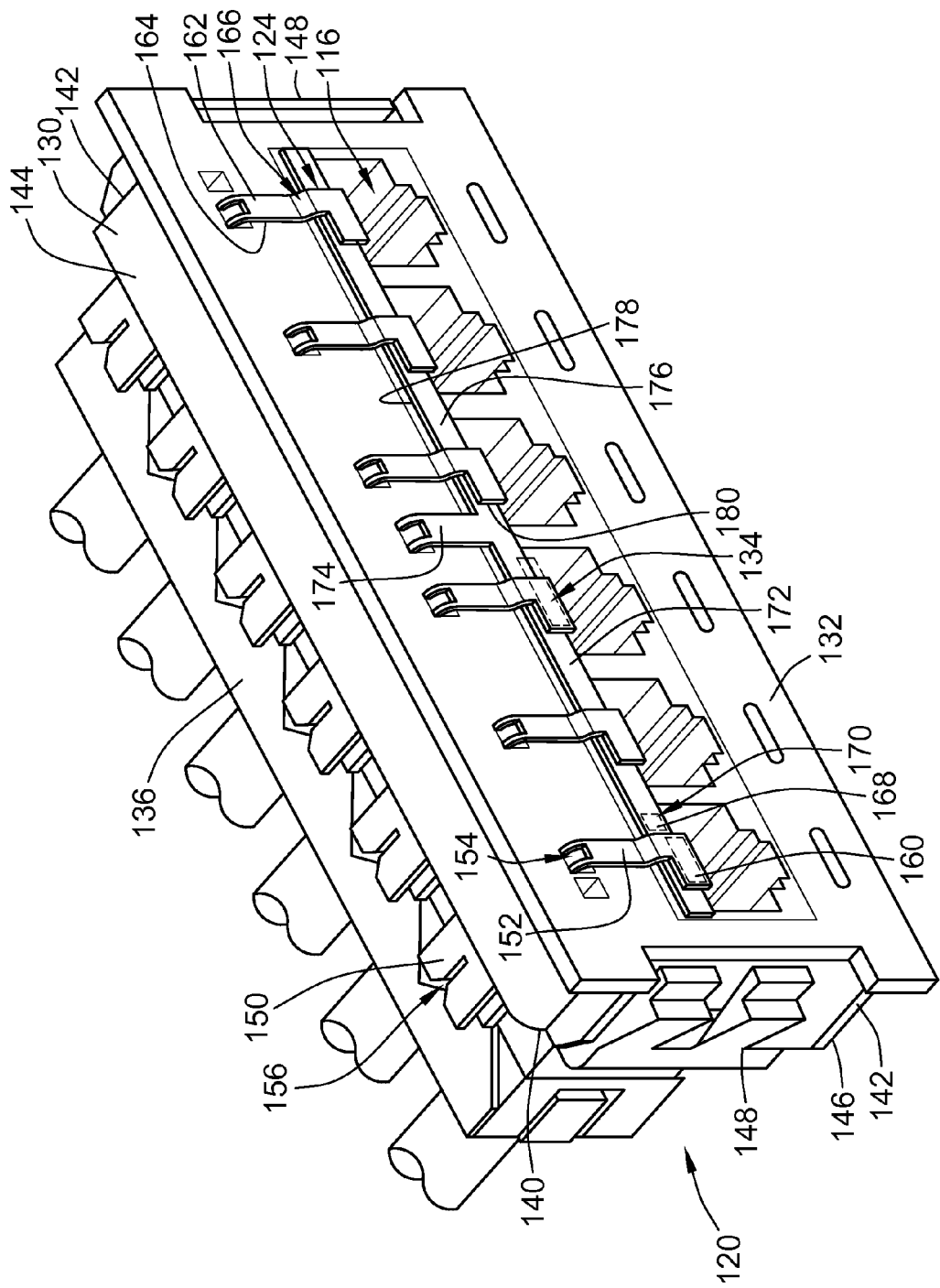
FIG. 2 is a front perspective view of a portion of the receptacle assembly shown in FIG. 1 utilizing a connectivity sensor.

FIG. 2 is a front perspective view of the receptacle assembly 120 with the faceplate 138 (shown in FIG. 1) removed for clarity exposing the front mating face 132 of the housing 130. The housing 130 also includes a rear 140 opposite the front mating face 132. The individual modular jacks 136 are loaded through the rear 140 of the housing 130 such that the receptacles 116 are open and accessible through the front mating face 132. Other mating arrangements are possible in alternative embodiments.

The housing 130 also includes sides 142, a top 144 and a bottom 146. Latches 148 are provided on the sides 142 for securing the receptacle assembly 120 within the panel 112 (shown in FIG. 1).

The housing 130 includes contact towers 150 extending rearward from the rear 140. In an exemplary embodiment, the connectivity sensors 124 are represented by discrete contacts identified as sense contacts 152 that extend into the contact towers 150 through openings 154 in the front mating face 132. The sense contacts 152 extend from the connectivity sensor areas 134 along the front mating face 132 and include a 90° bend which allows the sense contacts 152 to extend into the openings 154. Wire terminating ends of the sense contacts 152 are positioned within the contact towers 150. The contact towers 150 include wire slots 156 that are configured to receive wires (not shown) therein. The wires are terminated to the sense contacts 152 within the contact towers 150. For example, the wire terminating ends of the sense contacts 152 may include an insulation displacement contact that allows the wire and the sense contacts 152 to be electrically connected together. Other types of wire termination means may be provided at the wire terminating end of the sense contacts 152 to make electrical connection with the wire. The wires may be part of the connectivity management system 100 (shown in FIG. 1) that are eventually routed to the analyzer 102 (shown in FIG. 1), or alternatively are routed to a connector that may be electrically connected to a cable that is routed to the analyzer 102. The wires send and/or receive connectivity signals as part of the connectivity management system 100. The sense contacts 152 form discrete circuits with the corresponding wires, which allows the connectivity management system 100 to monitor the connectivity status of the receptacle 116 associated with the particular sense contacts 152.

The sense contacts 152 each include a sense pad 160 at a distal end thereof. The sense pad 160 is the portion of the sense contact 152 that is exposed through the faceplate 138 (shown in FIG. 1), and the sense pad 160 generally defines a portion of the connectivity sensor area 134. The sense pads 160 may represent the entire sense contacts 152 in some embodiments. In the illustrated embodiment, the sense pad 160 is positioned directly vertically above the corresponding receptacle 116. Each sense contact 152 includes a front surface 162 and a rear surface 164. The rear surface 164 extends along the front mating face 132 of the housing 130. In an exemplary embodiment, the sense contacts 152 are nonplanar, with the sense pads 160 being elevated from the front mating face 132. Each sense contact 152 includes a jogged section 166 that transitions the sense pad 160 away from the front mating face 132. In an alternative embodiment, the sense contacts 152 are planar.

The connectivity sensors 125 are represented by contacts identified as ground contacts 168. The ground contacts 168 include ground pads 170, which are the portions of the ground contacts 168 that are exposed through the faceplate 138. The ground pads 170 may represent the entire ground contacts 168 in some embodiments. The ground pads 170, with the corresponding sense pad 160, generally define the connectivity sensor area 134. The ground pad 170 is the portion of the ground contact 168 that is engaged by the connectivity pin 123 (shown in FIG. 1). The ground pads 170 are positioned immediately adjacent to one side or the other of a corresponding sense contact 152. In the illustrated embodiment, each of the ground contacts 168 are electrically commoned by a ground contact strip 172 extending across the front mating face 132 of the housing 130 adjacent multiple receptacles 116. The ground contact strip 172 defines the ground contacts 168 and the ground pads 170. Alternatively, separate metal components defining the ground contacts 168 and the ground pads 170 may be electrically and mechanically coupled to the ground contact strip 172. The ground contacts 168 cooperate with corresponding sense contacts 152 to define the connectivity sensors 124, 125 above each receptacle 116. The pair of connectivity pins 122, 123 engages the corresponding sense contact 152 and ground contact 168.

The ground contact strip 172 is electrically grounded. For example, the ground contact strip 172 includes a main contact 174 extending through the housing 130 to one of the contact towers 150. The main contact 174 may be electrically connected to a grounded wire (not shown). The ground contact strip 172 may be electrically grounded in other ways in alternative embodiments. It is realized that, rather than electrically commoning each of the ground contacts 168 using the ground contact strip 172, each of the ground contacts 168 may include its own main contact that is directly electrically connected to a grounded wire. In other alternative embodiments, rather than electrically grounding the second contacts of the pair of connectivity sensors 125, the second contacts may be electrically connected to individual wires in a similar manner as the sense contacts 152.

The ground contact strip 172 has a generally planar body that includes a front surface 176 and a rear surface 178. The rear surface 178 directly engages the front mating face 132 of the housing 130. Optionally, the rear surface 178 may directly engage the front of the modular jacks 136 rather than, or in addition to, the front mating face 132. The ground contact strip 172 may be secured to the front mating face 132, such as by an adhesive, a fastener, a barb of the ground contact strip 172, or captured by housing retention fasteners, and the like.

In the illustrated embodiment, the ground contact strip 172 is positioned between the sense contacts 152 and the front mating face 132. The sense pads 160 extend over the ground contact strip 172 such that the sense contacts 152 and the ground contact strip 172 are arranged in a multilayer arrangement. The jogged sections 166 allows the sense pads 160 to be positioned forward of the ground contact strip 172. In an alternative embodiment, the ground contact strip 172 may be positioned forward of the sense contacts 152 rather than behind the sense contacts 152.

Insulators 180 are positioned between the sense contacts 152 and the ground contact strip 172. The insulators 180 electrically isolate the sense contacts 152 from the ground contact strip 172. The insulators 180 create a physical barrier between the sense contacts 152 and ground contact strip 172. The insulators 180 may be sized and shaped to maintain physical separation between the sense contacts 152 and ground contact strip 172. The insulators 180 may be a coating, a pad, a film or the like applied to the front surface 176 of the ground contact strip 172 or the rear surface 164 of the corresponding sense contact 152. The insulators 180 are manufactured from a dielectric material, such as a plastic material.

In an alternative embodiment, rather than the ground contact strip 172 being positioned behind the sense contacts 152, the ground contact strip 172 may be positioned above the sense contacts 152, such as near the top 144 of the housing 130. The ground contact strip 172 may then include individual fingers that extend downward therefrom to the corresponding connectivity sensor areas 134. Insulators may be positioned between the individual fingers defining the ground contacts 168 and the sense contacts 152.

Returning to FIG. 1, one of the plugs 114 is illustrated received within one of the receptacles 116. The connectivity pins 122, 123 are electrically connected to the pair of connectivity sensors 124, 125, represented by the ground contact 168 and the sense contact 152. The ground contact 168 and the corresponding sense contact 152 cooperate to form part of a sense circuit. When the connectivity pins 122, 123 engage the ground contact 168 and the corresponding sense contact 152, the sense circuit is closed allowing the analyzer to gather the connectivity status of the receptacle 116. In an exemplary embodiment, the connectivity pins 122, 123 are spring-loaded such that the connectivity pins 122, 123 are biased against the connectivity sensors 124, 125 when the plug 114 is loaded into the receptacle 116. Both the ground contacts 168 and the sense contacts 152 are accessible through the faceplate 138. Because the sense contact 152 is positioned forward of the ground contact strip 172, the sense contact 152 and the ground contact 168 are non-coplanar. As a result, one of the connectivity pins 123 is required to extend further than the other connectivity pins 122.

Figure 3:
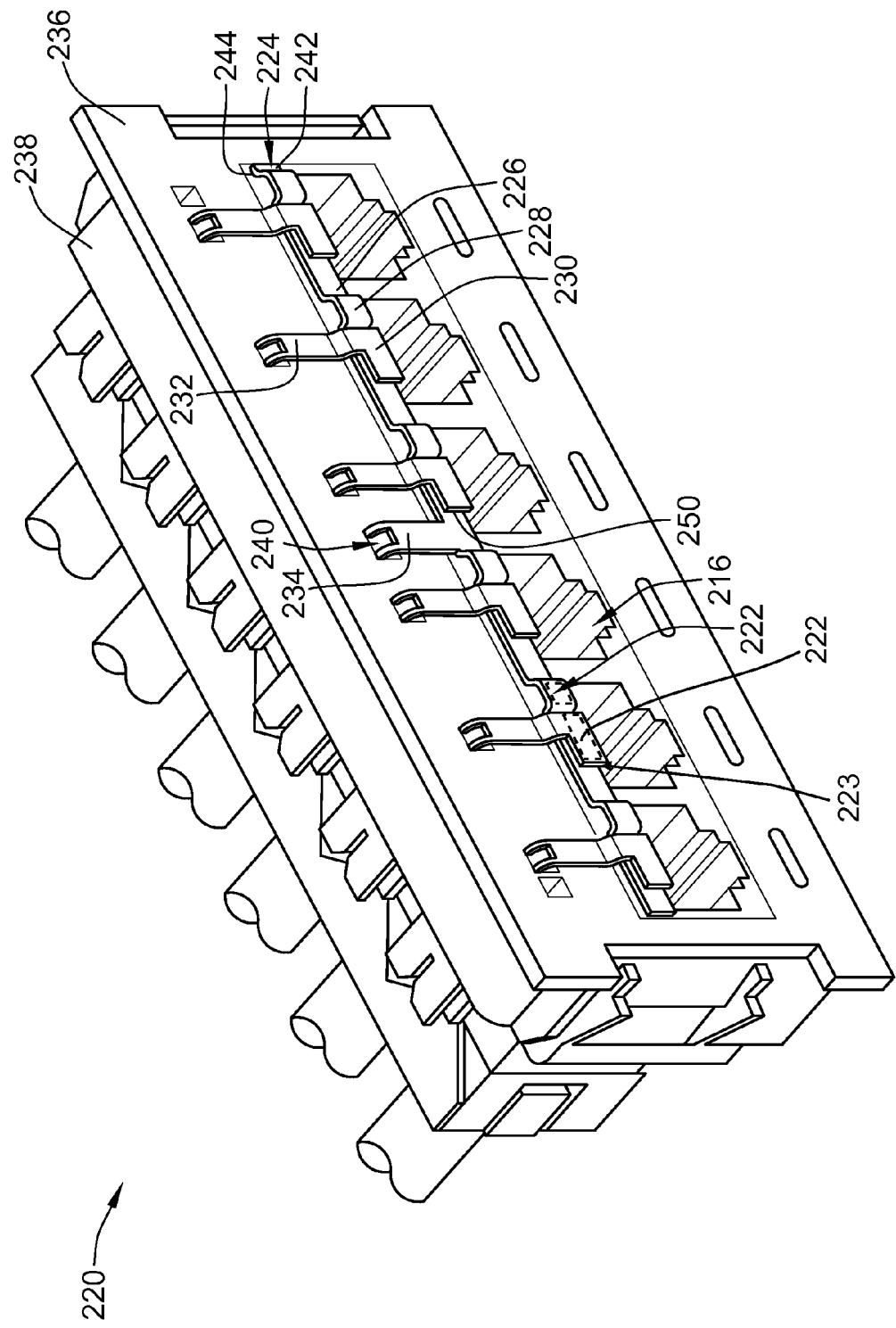
FIG. 3 is a front perspective view of an alternative receptacle assembly that utilizes an alternative connectivity sensor.

FIG. 3 is a front perspective view of an alternative receptacle assembly 220 that utilizes alternative connectivity sensors 222. The connectivity sensors 222 are provided in connectivity sensor areas 223, which are the areas that the connectivity pins 122, 123 (shown in FIG. 1) of the plug 114 (shown in FIG. 1) engage when mated to the receptacle assembly 220. The receptacle assembly 220 differs from the receptacle assembly 120 (shown in FIGS. 1 and 2) in that the receptacle assembly 220 includes a ground contact strip 224 that is different than the ground contact strip 172 (shown in FIG. 2).

The ground contact strip 224 has a nonplanar body that includes a base 226 and ground pads 228 positioned forward of the base 226. In an exemplary embodiment, the ground contact strip 224 is stamped and formed to define the base 226 and ground pads 228. For example, the ground pads 228 may be formed by bending the body into a U-shape with the ends of the U-shaped ground pads 228 extending from the base 226. As such, the ground pads 228 are elevated from the base 226.

In an exemplary embodiment, the outer portions of the ground pads 228 are substantially coplanar with sense pads 230 of sense contacts 232 that are similar to the sense contacts 152 (shown in FIG. 2). The ground pads 228 define ground contacts that cooperate with corresponding ones of the sense contacts 232 to define a pair of connectivity sensors above each receptacle 216. The base 226 of the ground contact strip 224 is positioned underneath the sense contacts 232. As such, the sense pads 230 extend over the ground contact strip 224 such that the sense contacts 232 and the ground contact strip 224 are arranged in a multilayer arrangement.

The ground contact strip 224 includes a main contact 234 that extends upward from the base 226 along a front mating face 236 of a housing 238 of the receptacle assembly 220. The main contact 234 extends into an opening 240 in the housing 238. The ground contact strip 224 includes a front surface 242 and a rear surface 244. The rear surface 244 directly engages the front mating face 236 of the housing 238.

Insulators 250 are positioned between the sense contacts 232 and the ground contact strip 224. The insulators 250 electrically isolate the sense contacts 232 from the ground contact strip 224. The insulators 250 create a physical barrier between the sense contacts 232 and ground contact strip 224. In an exemplary embodiment, the insulators 250 are positioned behind the sense contacts 232 between a rear surface of the sense contacts 232 and the front surface 242 of the base 226. Optionally, the insulators 250 may also be positioned along a side of the sense contacts 232 directly between the sense contacts 232 and the ground pads 228.

Figure 4:
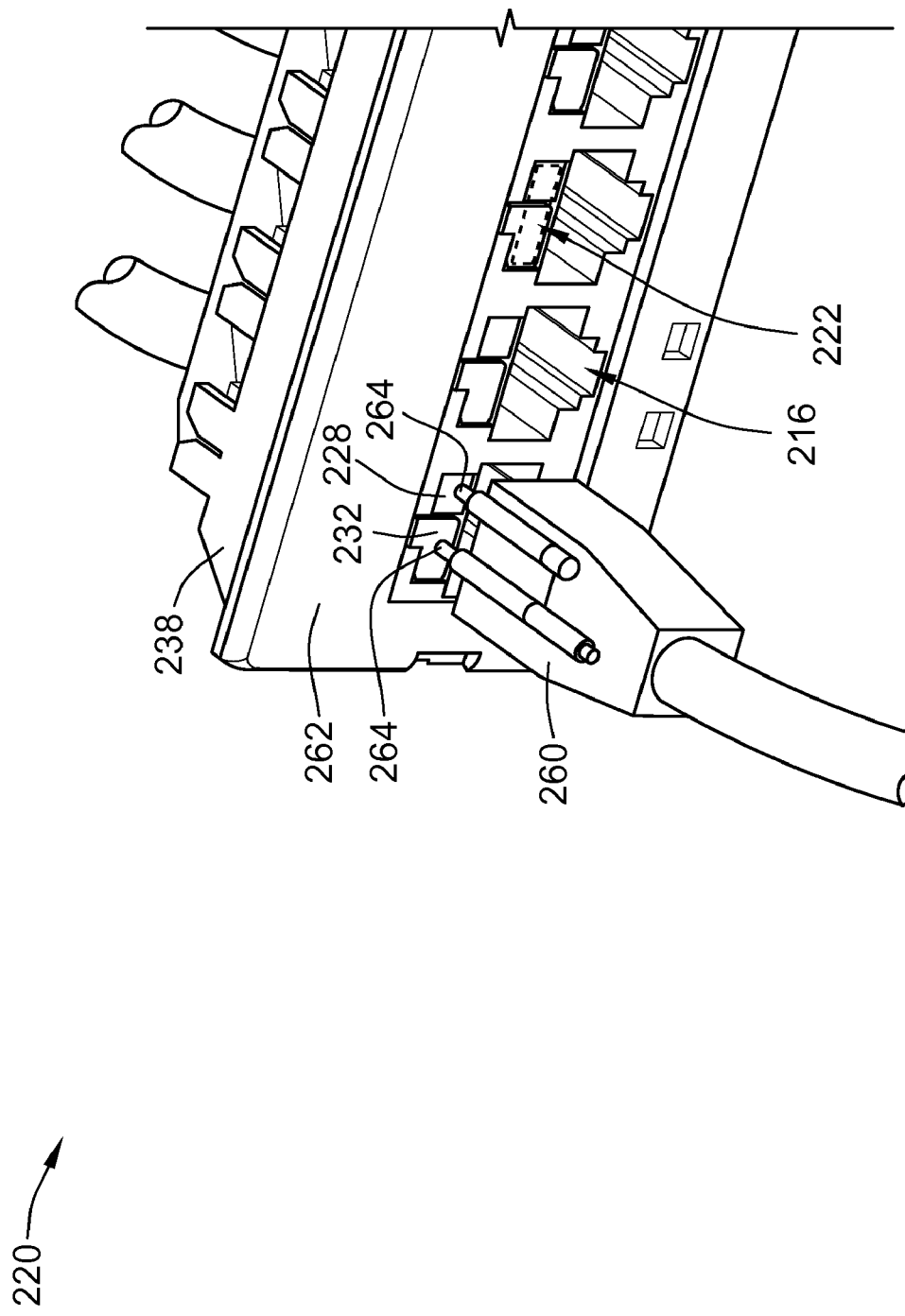
FIG. 4 illustrates the receptacle assembly shown in FIG. 3 with a plug mated to the receptacle assembly.

FIG. 4 illustrates the receptacle assembly 220 with a plug 260 mated to the receptacle assembly 220. A faceplate 262 is coupled to the housing 238. The faceplate 262 exposes each receptacle 216 and each pair of connectivity sensors 222. In the illustrated embodiment, each pair of connectivity sensors 222 is represented by the sense contact 232 and the ground pad 228. The sense contact 232 and the ground pad 228 are generally coplanar with one another. The sense contact 232 and the ground pad 228 cooperate to form part of a sense circuit.

When the plug 260 is loaded into the receptacle 216, a pair of connectivity pins 264 engages the connectivity sensors 222 to indicate a connectivity status of the receptacle 216. The connectivity pins 264 also form part of the sense circuit. When the connectivity pins 264 engage the connectivity sensors 222, the sense circuit is closed allowing the analyzer to gather the connectivity status of the receptacle 216. Because the sense contact 232 and the ground pad 228 are generally coplanar with one another, the connectivity pins 264 are configured simultaneously mate with the connectivity sensors 222.

Figure 5:
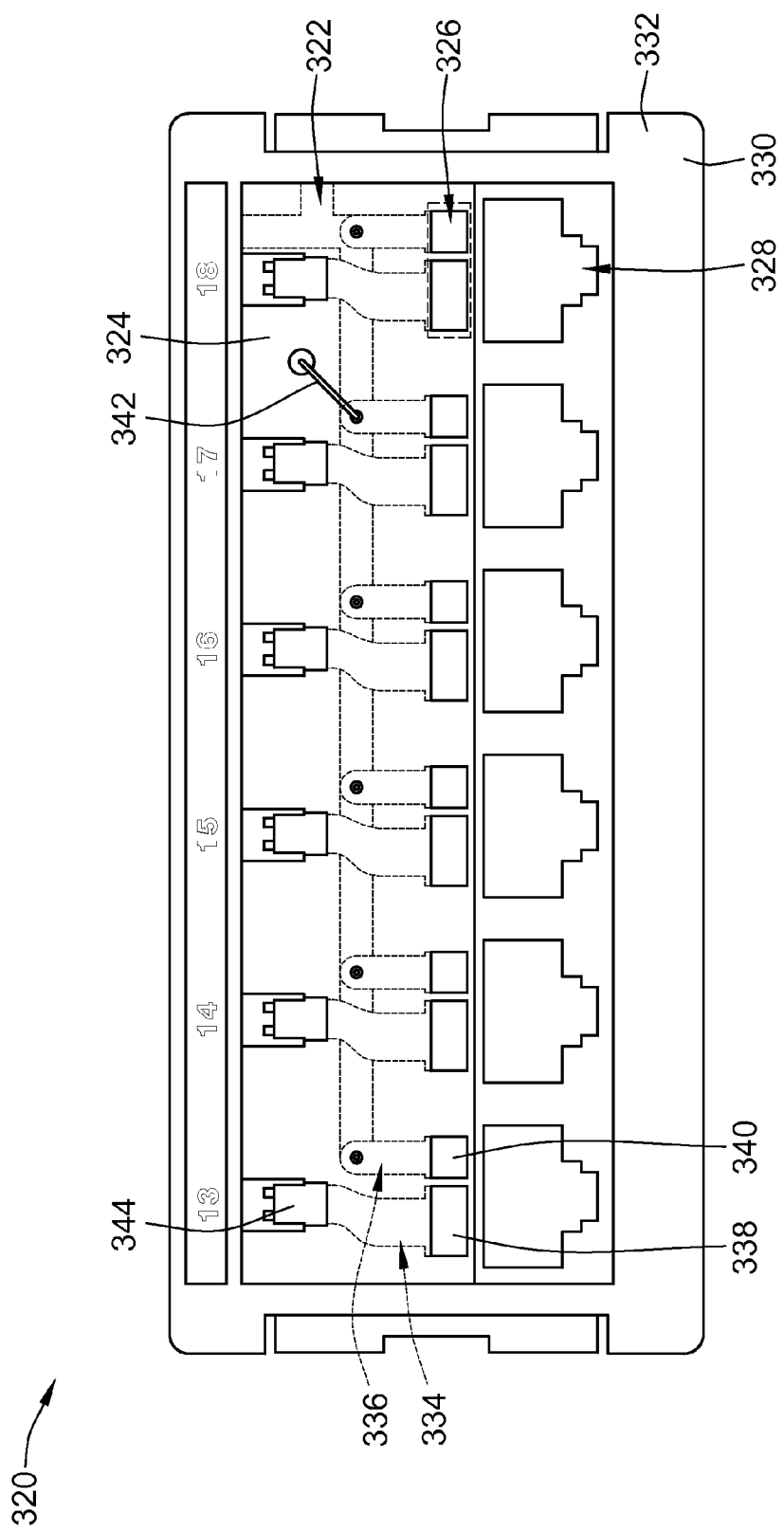
FIG. 5 is a front perspective view of another alternative receptacle assembly utilizing another alternative connectivity sensor.

FIG. 5 is a front perspective view of another alternative receptacle assembly 320 utilizing another alternative connectivity sensor 322. In the illustrated embodiment, the connectivity sensor 322 is represented by a circuit board. The connectivity sensor 322 includes a substrate 324 having a plurality of connectivity sensor areas 326. Each connectivity sensor areas 326 is associated with a corresponding receptacle 328 of the receptacle assembly 320. The receptacles 328 and connectivity sensor 322 are held by a housing 330 at a front mating face 332 of the housing 330.

The connectivity sensor 322 includes a plurality of first sense circuits 334 and a plurality of second sense circuits 336. Each of the sense circuits 334, 336 include a sense pad 338, 340, respectively, at the corresponding connectivity sensor areas 326. As such, each connectivity sensor areas 326 includes two sense pads 338, 340 that are part of different circuits. Optionally, each of the sense pads 340 representing the second sense circuits 336 may be electrically commoned together. Each of the sense pads 340 may also be grounded. For example, in the illustrated embodiment, a grounded wire 342 may be electrically connected to one of the second sense circuits 336. Each of the second sense circuits 336 may be electrically connected together by a trace or layer of the circuit board.

Each of the first sense circuits 334 represents discrete circuits. The first sense circuits 334 include sense contacts 344. In the illustrated embodiment, the sense contacts 344 are soldered to the circuit board in such a way that the sense contacts 344 are electrically connected to corresponding sense pads 338.

The sense pads 338, 340 are arranged adjacent to one another directly vertically above the receptacles 328. As such, when a plug (not shown) is loaded into the receptacle 328, connectivity pins (not shown) associated with the plug engage the sense pads 338, 340. The sense pads 338, 340 form a part of a connectivity management system that is able to determine connectivity status of the receptacle 328 when the sense pads 338, 340 are engaged by the connectivity pins of the plug.

Figure 6:
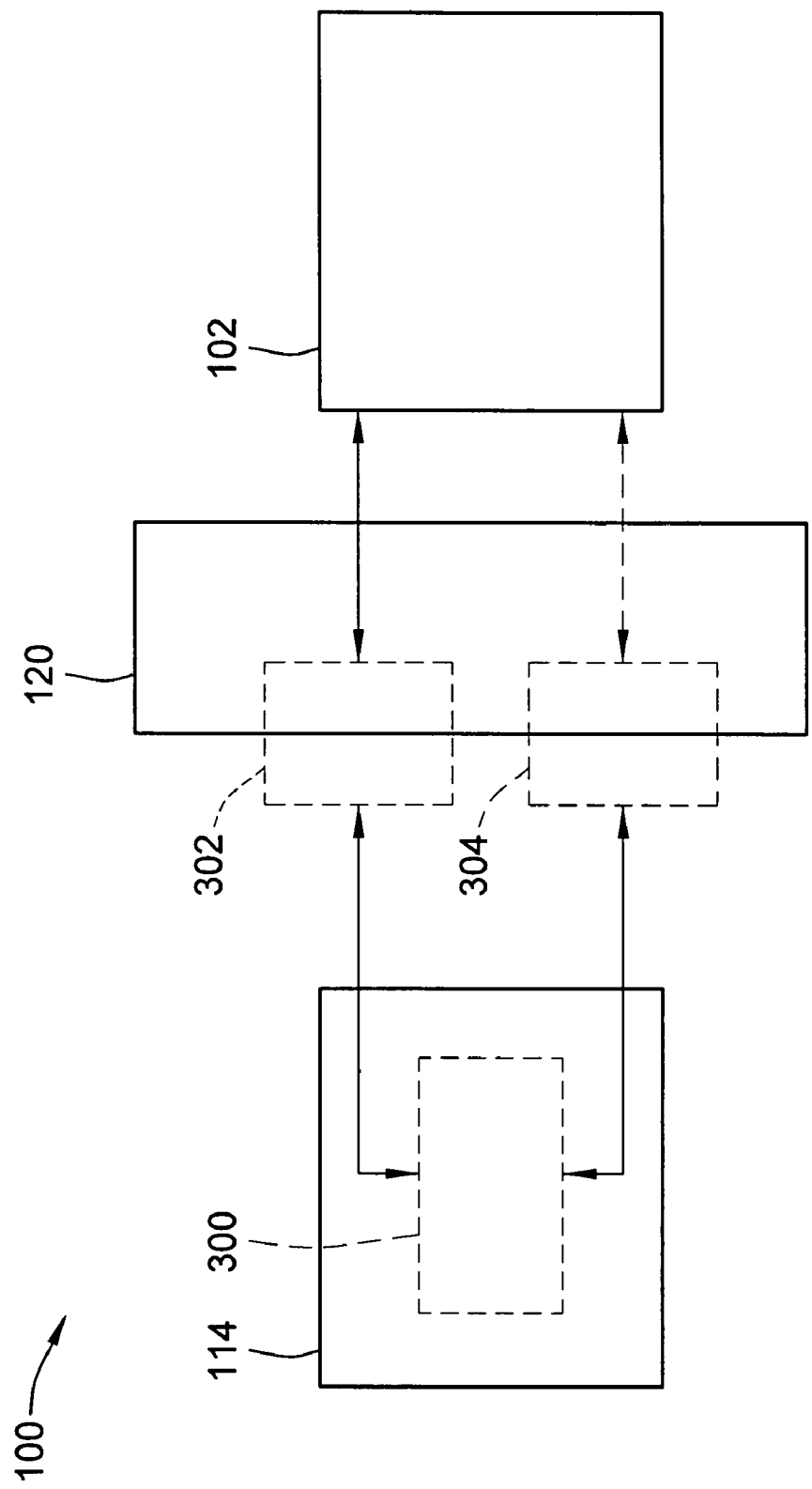
FIG. 6 is a schematic illustration of the connectivity management system shown in FIG. 1.

FIG. 6 is a schematic illustration of the connectivity management system 100, illustrating the analyzer 102, the receptacle assembly 120, and the plug 114. The receptacle assemblies 220 or 320 (shown in FIG. 4) may be used in place of the receptacle assembly 120. The plug 114 includes a memory logic circuit 300 integral to the plug 114. The memory logic circuit 300 is capable of uniquely identifying the particular plug 114. The receptacle assembly 120 includes a first sense circuit 302 and may include a second sense circuit 304. In lieu of the second sense circuit 304, the receptacle assembly 120 may include a ground circuit that is electrically grounded. In an exemplary embodiment, the first sense circuit 302 includes the sense contact 152 (shown in FIG. 2) and the second sense circuit 304 includes the ground contact 168 (shown in FIG. 2).

In operation, the analyzer 102 communicates with the first sense circuit 302 and/or the second sense circuit 304. The analyzer 102 is able to send and/or receive signals from the corresponding sense circuits 302, 304. The first sense circuit 302 communicates with the memory logic circuit 300. For example, the first sense circuit 302 may communicate with the memory logic circuit 300 via the first sensor probe 122 (shown in FIG. 1). The second sense circuit 304 communicates with the memory logic circuit 300. For example, the second sense circuit 304 may communicate with the memory logic circuit 300 via the second sensor probe 123 (shown in FIG. 1). In an exemplary embodiment, an interrogation signal may be periodically, or continuously, sent from the analyzer 102 to the memory logic circuit 300 and either the first and/or second sense circuits 302, 304. Connectivity data, such as data that uniquely identifies the particular plug 114, may then be transmitted back to the analyzer 102 after the interrogation signal is received.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A receptacle assembly comprising:
   a housing having a front mating face, the housing having receptacles configured to receive plugs therein through the front mating face, the plugs having connectivity pins attached thereto;
   a circuit board coupled to the front mating face of the housing; and
   connectivity sensor areas associated with the receptacles, each connectivity sensor area being positioned adjacent the corresponding receptacle, each connectivity sensor area having a first connectivity sensor and a second connectivity sensor, wherein the second connectivity sensor is electrically isolated from the first connectivity sensor when the plug is disconnected from the receptacle, and wherein both the first and second connectivity sensors are configured to be engaged by different connectivity pins of the plug when the plug is received in the corresponding receptacle to form a sense circuit, the first and second connectivity sensors being provided on the circuit board such that the circuit board has multiple sense circuits defined thereon.

2. The receptacle assembly of claim 1, further comprising insulators, the first and second connectivity sensors being arranged in a multilayer arrangement with the insulators positioned between the first and second connectivity sensors.

3. The receptacle assembly of claim 1, wherein more than one of the second connectivity sensors are electrically communed together.

4. The receptacle assembly of claim 1, wherein at least a portion of the second connectivity sensor is positioned between the front mating face of the housing and the first connectivity sensor.

5. The receptacle assembly of claim 1, further comprising insulators positioned between the first and second connectivity sensors to electrically isolate the first and second connectivity sensors, the first and second connectivity sensors being arranged in a multilayer arrangement with the insulators.

6. The receptacle assembly of claim 1, wherein the first connectivity sensors are electrically connected to the a connectivity management system, the first connectivity sensors being configured to sense the connectivity status of the corresponding receptacle.

7. The receptacle assembly of claim 1, wherein the sense circuit is closed when the first and second connectivity sensors are engaged by the connectivity pins of the plug to convey a unique plug identification to an analyzer.

8. The receptacle assembly of claim 1, wherein the sense circuit forms part of a connectivity management system that is used to identify the receptacle and unique information about the particular plug received within the corresponding receptacle.

9. The receptacle assembly of claim 1, further comprising a ground contact strip that is electrically grounded, the ground contact strip extending across the front mating face of the housing adjacent multiple ones of the receptacles, at least two of the second connectivity sensors forming part of the ground contact strip to provide grounding of the sense circuit.

10. A receptacle assembly comprising:
    a housing having a front mating face, the housing having receptacles configured to receive plugs therein through the front mating face;
    a ground contact strip being electrically grounded, the ground contact strip extending across the front mating face adjacent the receptacles; and
    sense contacts being positioned adjacent corresponding ones of the receptacles, the sense contacts having sense pads, the sense pads extending over the ground contact strip such that the ground contact strip is positioned between the front mating face of the housing and the sense pads; and
    an insulator positioned between each of the sense contacts and the ground contact strip, the insulator insulating the sense contacts from direct contact with the ground contact strip.

11. The receptacle assembly of claim 1, wherein the housing includes contact openings extending therethrough, the first connectivity sensors extending into the contact openings to a rear of the housing, the first connectivity sensors being configured to be terminated to corresponding wires of a connectivity management system at the rear of the housing.

12. The receptacle assembly of claim 1, the first connectivity sensors being part of discrete circuits, the second connectivity sensors being part of a common electrical circuit.

13. A receptacle assembly comprising:
    a housing having a front mating face, the housing having receptacles configured to receive corresponding plugs therein through the front mating face;
    ground contacts being electrically grounded, the ground contacts being positioned adjacent corresponding ones of the receptacles; and
    sense contacts forming part of a connectivity management system, the sense contacts being positioned adjacent corresponding ones of the receptacles; wherein the ground contacts and the sense contacts are arranged in pairs as part of a sense circuit, the ground contact and the sense contact of a particular sense circuit being configured to be engaged by different connectivity pins of one of the plugs when the particular plug is loaded into the corresponding receptacle so that upon mating of the plug and receptacle the sense circuit is created to transfer connectivity information through the connectivity management system.

14. The receptacle assembly of claim 13, further comprising insulators positioned between the ground contacts and corresponding ones of the sense contacts, the ground and sense contacts being arranged in a multilayer arrangement with the insulators.

15. The receptacle assembly of claim 13, wherein at least a portion of the ground contact is positioned between the front mating face of the housing and the corresponding sense contact.

16. The receptacle assembly of claim 13, wherein the ground contacts are integrally formed with a ground contact strip extending across the front mating face of the housing adjacent multiple ones of the receptacles, the sense contacts being positioned adjacent the ground contact strip.

17. The receptacle assembly of claim 10, wherein the sense contacts are electrically connected to a connectivity management system, the sense contacts being configured to sense the connectivity status of the corresponding receptacle.

18. The receptacle assembly of claim 10, wherein the ground contact strip and the sense contacts are arranged in a multilayer arrangement with the insulators positioned between the sense pads and the ground contact strip.

19. The receptacle assembly of claim 13, further comprising a circuit board coupled to the front mating face of the housing, the ground contacts and sense contacts being provided on the circuit board such that the circuit board has multiple sense circuits defined thereon.

20. The receptacle assembly of claim 10, wherein the ground contact strip is non-planar with the ground contact strip having a base and ground pads positioned forward of the base, the ground pads being substantially coplanar with the sense pads.

* * * * *

UNITED STATES PATENT AND TRADEMARK OFFICE
CERTIFICATE OF CORRECTION

PATENT NO. : 8,152,560 B2  
APPLICATION NO. : 12/762813  
DATED : April 10, 2012  
INVENTOR(S) : Charles Randall Malstrom et al.

Page 1 of 1

It is certified that error appears in the above-identified patent and that said Letters Patent is hereby corrected as shown below:

Title Page, Item (12) change "Malstron et al." to "Malstrom et al."

Title Page, Item (75) Inventors, change "Charles Randall Malstron" to "Charles Randall Malstrom"

Signed and Sealed this  
Seventh Day of August, 2012

David J. Kappos  
*Director of the United States Patent and Trademark Office*